(12) United States Patent
Aoki

(10) Patent No.: US 6,343,681 B1
(45) Date of Patent: Feb. 5, 2002

(54) TRANSMISSION SYSTEM WITH AN OVERRUNNING CLUTCH

(75) Inventor: Jun Aoki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/612,318

(22) Filed: Jul. 7, 2000

(30) Foreign Application Priority Data

Aug. 9, 1999 (JP) .......................................... 11-225534

(51) Int. Cl.[7] .......................... F16D 41/04; F16D 47/04
(52) U.S. Cl. .......................... 192/35; 192/38; 192/48.4; 192/48.92
(58) Field of Search ............................. 192/35, 38, 44, 192/48.4, 48.92, 54.52

(56) References Cited

U.S. PATENT DOCUMENTS 5,234,389 A * 8/1993 Goates ....................... 475/297
5,326,333 A * 7/1994 Niizawa et al. ............. 475/249
5,464,084 A * 11/1995 Aoki et al. .................. 192/35
5,720,375 A * 2/1998 Maeda et al. ................. 192/35

FOREIGN PATENT DOCUMENTS

JP          11-125279 A    *  5/1999

* cited by examiner

Primary Examiner—Richard M. Lorence
(74) Attorney, Agent, or Firm—Armstrong, Westerman, Hattori, McLeland & Naughton, LLP

(57) ABSTRACT

A main clutch 9 is interposed between an input shaft 3 and an output shaft 5, and a normally engaged pilot clutch 10 is interposed between an output member 7c of an overrunning clutch 7 and the output shaft 5. An input member 7a of the overrunning clutch 7 is made to freely rotate relative to the input shaft 3, and a cam mechanism 11 is provided for generating a thrust force by virtue of the difference in rotational speed between the input shaft 7 and the input member 7a, whereby the main clutch 9 is brought into engagement with this thrust force so generated.

6 Claims, 5 Drawing Sheets

TRANSMISSION SYSTEM WITH AN OVERRUNNING CLUTCH

BACKGROUND OF THE INVENTION

1. Field of the Invention

The present invention relates to a transmission system with an overrunning clutch capable of allowing overrunning rotation on an output side.

2. Description of the Related Art

Conventionally, a transmission system of this type is constructed such that an overrunning clutch is interposed between an input shaft and an output shaft, whereby a torque from an input shaft side is transmitted to an output shaft side via the overrunning clutch, whereas a reverse driving torque is prevented from being transmitted from the output shaft side to the input shaft side through the action of the overrunning clutch.

Note that there are two types of overrunning clutch; a one-way clutch which acts only in one direction, and a two-way clutch which allows the overrunning rotation of the output member in a clockwise direction when the input member rotates in the clockwise direction and allows the overrunning rotation of the output member in a counter-clockwise direction when the input member rotates in the counterclockwise direction.

Since the durability of an overrunning clutch is damaged when an excessive torque acts thereon, in a transmission system for transmitting a large magnitude of torque, a special overrunning clutch having a large torque transmission capacity needs to be used, and this surely increases costs.

SUMMARY OF THE INVENTION

The present invention was made in view of the above drawback, and an object thereof is to provide a transmission with an overrunning clutch capable of transmitting a large magnitude of torque even if it is provided with only a small torque transmission capacity.

With a view to attaining the above object, according to the present invention, there is provided a transmission system with an overrunning clutch capable of allowing overrunning rotation on an output side comprising a main clutch comprising in turn a mechanical friction clutch interposed between an input shaft and an output shaft of the transmission system and a pilot clutch comprising in turn a normally engaged friction clutch interposed between an output member of the overrunning clutch and the output shaft, wherein an input member of the overrunning clutch is allowed to freely rotate relative to the input shaft, and wherein a cam mechanism is coupled to the input member which is adapted to generate a thrust force to bring the main clutch into engagement by virtue of the difference in rotational speed between the input shaft and the input member.

When a load is acting on the output shaft, a loading torque equal to the torque transmission capacity of the pilot clutch is transmitted to the input member of the overrunning clutch via the pilot clutch and the overrunning clutch. When the input shaft is rotated in this state, there is generated a difference in rotational speed between the input shaft and the input member, and the main clutch is brought into engagement with the input member. Thus, even if the torque transmission capacity of the overrunning clutch is small, a large magnitude of torque can be transmitted from the input shaft to the output shaft via the main clutch.

In addition, when the rotation of the output shaft overruns that of the input shaft, since the loading torque is prevented from being transmitted to the input member of the overrunning clutch by virtue of the action of the overrunning clutch, the cam mechanism no more generates the thrust force and this releases the main clutch, whereby the reverse torque is prevented from being transmitted from the output shaft side to the input shaft side.

DETAILED DESCRIPTION OF THE PREFERRED EMBODIMENTS

Figure 1:
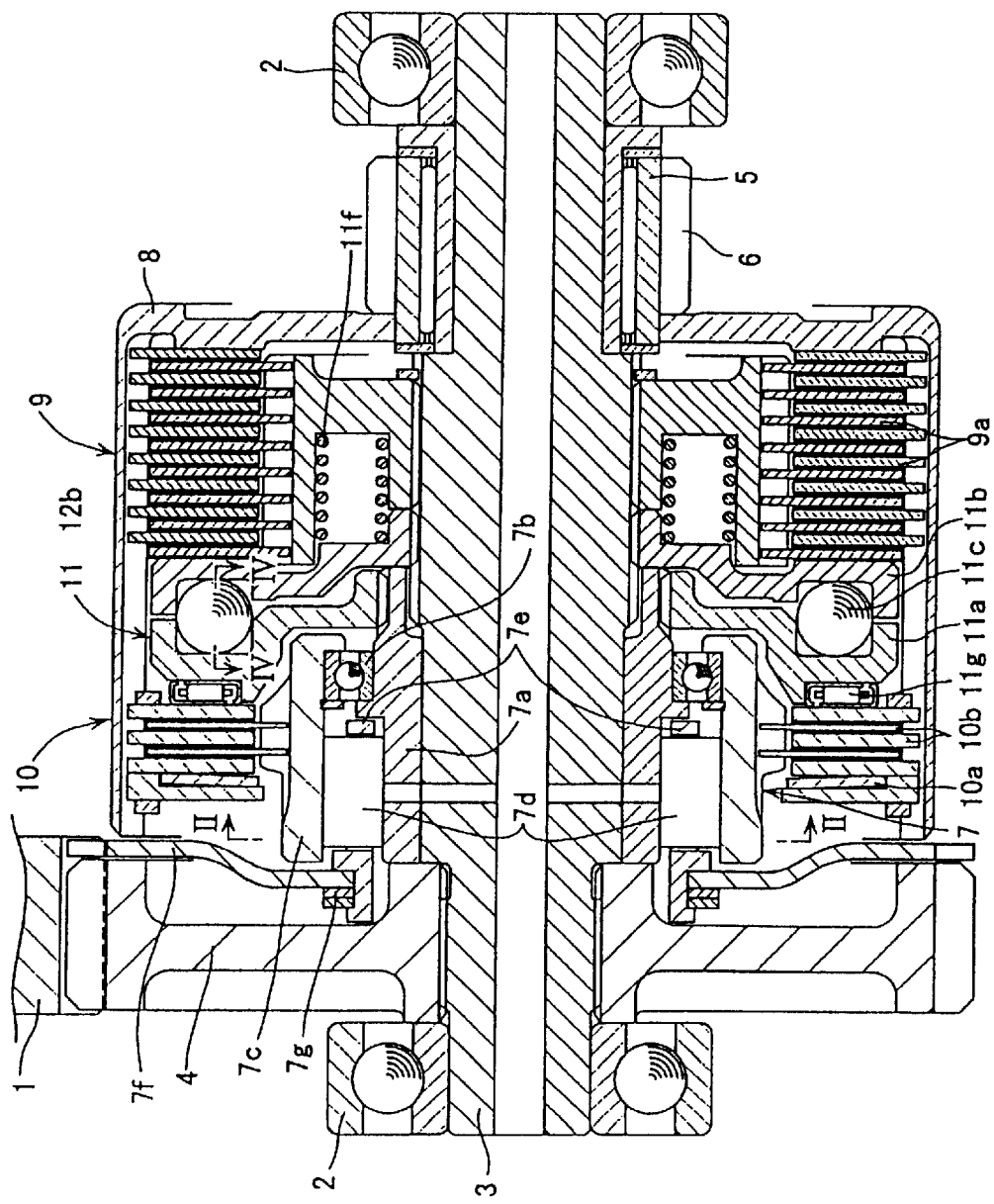
FIG. 1 is a longitudinal cross-sectional view of a first embodiment of a system according to the present invention.

Referring to FIG. 1, reference numeral 1 denotes a driving gear which is coupled to a drive source (not shown). An input gear 4 which mesh engages with the driving gear 1 is coupled to one end of an input shaft 3 which is rotatably supported on a casing (not shown) via a bearing 2. Further, a hollow output shaft 5 is rotatably supported on the other end of the input shaft 3 and this output shaft 5 is coupled to a driven member via a gear (not shown) which mesh engages with an output gear 6 formed in the output shaft 5. Thus, a transmission system is constructed which transmits a power from a drive source to the driven member.

This transmission system is provided with an overrunning clutch 7 comprising a two-way clutch. The overrunning clutch 7 comprises an inner race 7a acting as an input member rotatably inserted over the input shaft 3, an outer race 7c acting as an output member rotatably supported on the inner race 7a via a bearing 7b, a plurality of rollers 7d disposed at certain intervals in a circumferential direction between the inner race 7a and the outer race 7c, as shown in FIG. 2, a retainer 7e for retaining these rollers 7d with a certain circumferential play being maintained therebetween and a switching gear 7f mesh engaging with the driving gear 1. The switching gear 7f is brought into friction engagement with the retainer 7e with a biasing force of a coned disc spring 7g.

Figure 2A:
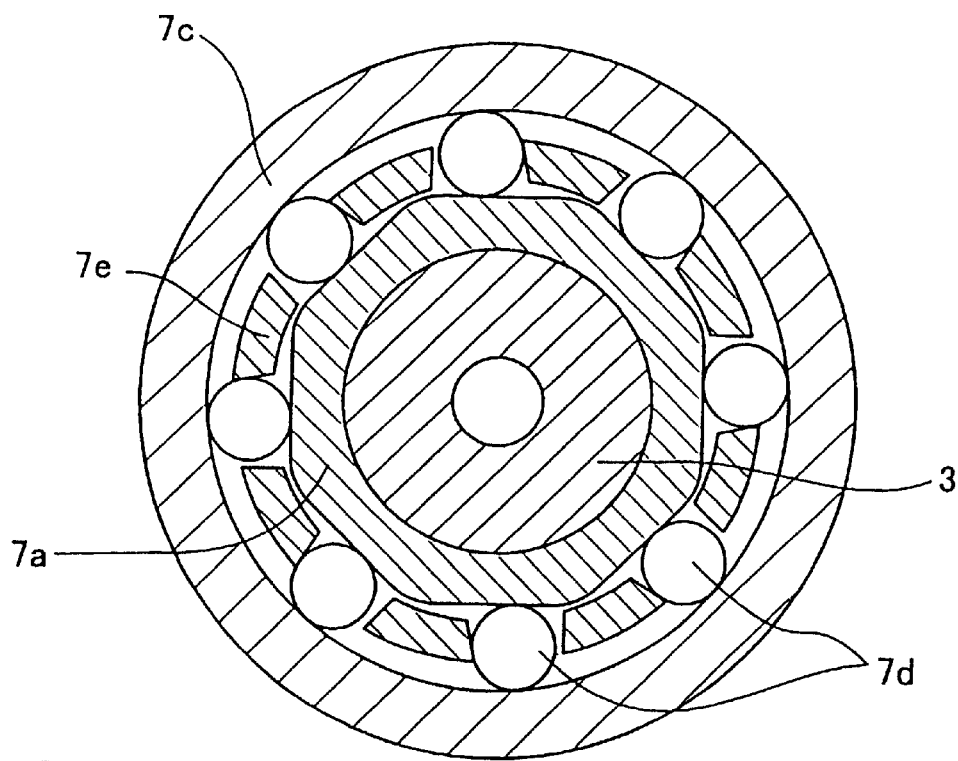
FIG. 2A is a transverse cross-sectional view taken along the line II—II of FIG. 1, showing a state in which an overrunning clutch rotates in a forward direction.
Figure 2B:
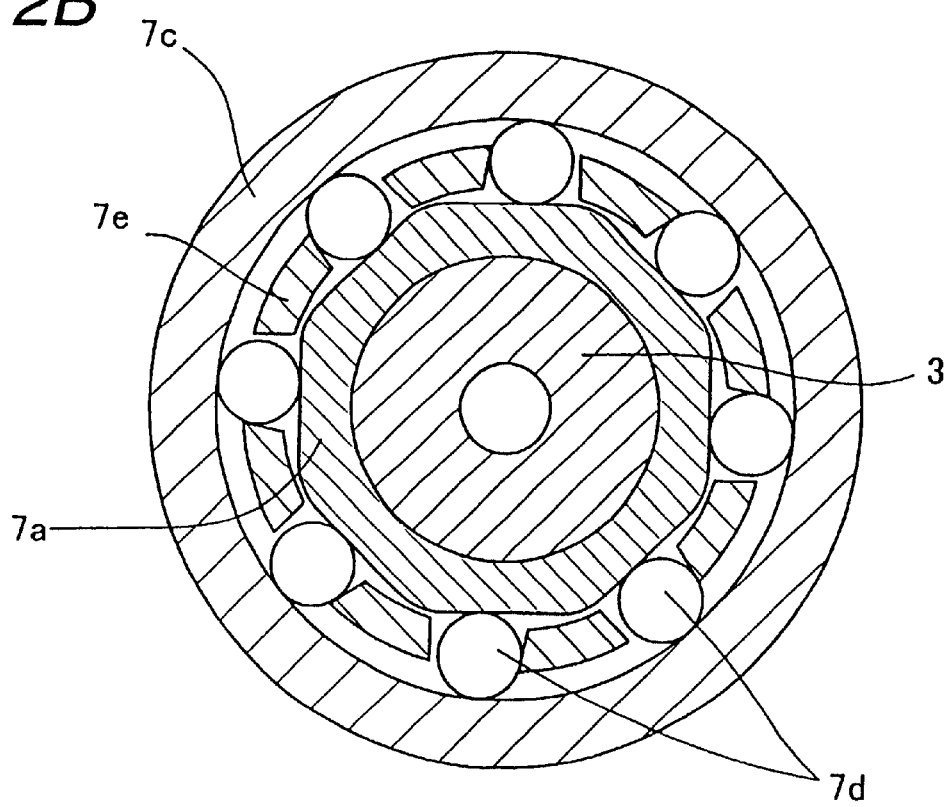
FIG. 2B is a transverse cross-sectional view showing a state in which the overrunning clutch rotates in a reverse direction.
Figure 3:
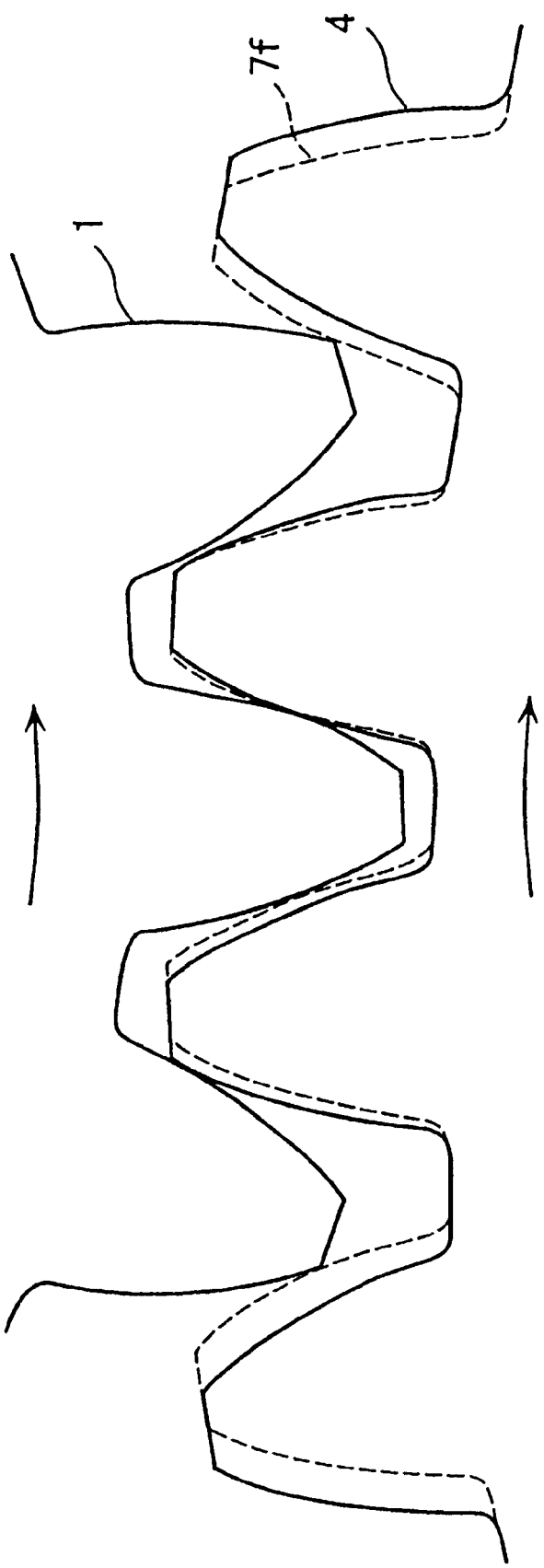
FIG. 3 is a diagram showing a mesh engagement state of a switching gear of the overrunning clutch.

The inner race 7a is formed into a polygonal shape in section having the same number of sides as the number of rollers 7d. In FIG. 2, assuming that a clockwise direction denotes a forward direction, in a state shown in FIG. 2A in which the retainer 7e has rotated to be displaced in a reverse direction, the overrunning rotation of the outer race 7c in the forward direction relative to the inner race 7a is permitted, and in a sate shown in FIG. 2B in which the retainer 7e has rotated to be displaced in the forward direction, the overrunning rotation of the outer race 7c in the reverse direction relative to the inner race 7a is permitted. Here, the number of teeth of the switching gear 7f is made larger by a predetermined number (for example, one) than the that of an input gear 4, and when the input gear 4, which is indicated by a solid line in FIG. 3, is rotated in the forward direction by the drive source via the driving gear 1, the switching gear 7f, which is indicated by a dotted line in FIG. 3, rotates in the reverse direction relative to the input gear 4, while rotating in the forward direction, and the retainer 7e is switched over to the state shown in FIG. 2A, whereby the overrunning rotation of the outer race 7c in the forward direction is permitted. In addition, when the input gear 4 is rotated in the reverse direction by the drive source via the driving gear 1, the switching gear 7f rotates in the forward direction relative to the input gear 4, and the retainer 7e is then switched over to the state shown in FIG. 2B, whereby the overrunning rotation of the outer race 7c in the reverse direction is permitted.

Furthermore, a clutch drum 8 is provided on the transmission system which is coupled to the output shaft 5, and a main clutch 9 comprising a mechanical type friction clutch is interposed between the drum clutch 8 and the input shaft 3. In addition, a pilot clutch 10 comprising a friction clutch, which is normally engaged by virtue of the biasing force of a coned disc spring 10a, is interposed between the drum clutch 8 and the outer race 7c of the overrunning clutch 7. Moreover, a cam mechanism 11 is coupled to the inner race 7a of the overrunning clutch 7 so as to produce a thrust force to bring the main clutch 9 into engagement by virtue of the difference in rotational speed between the input shaft 3 and the inner race 7a.

Figure 4:
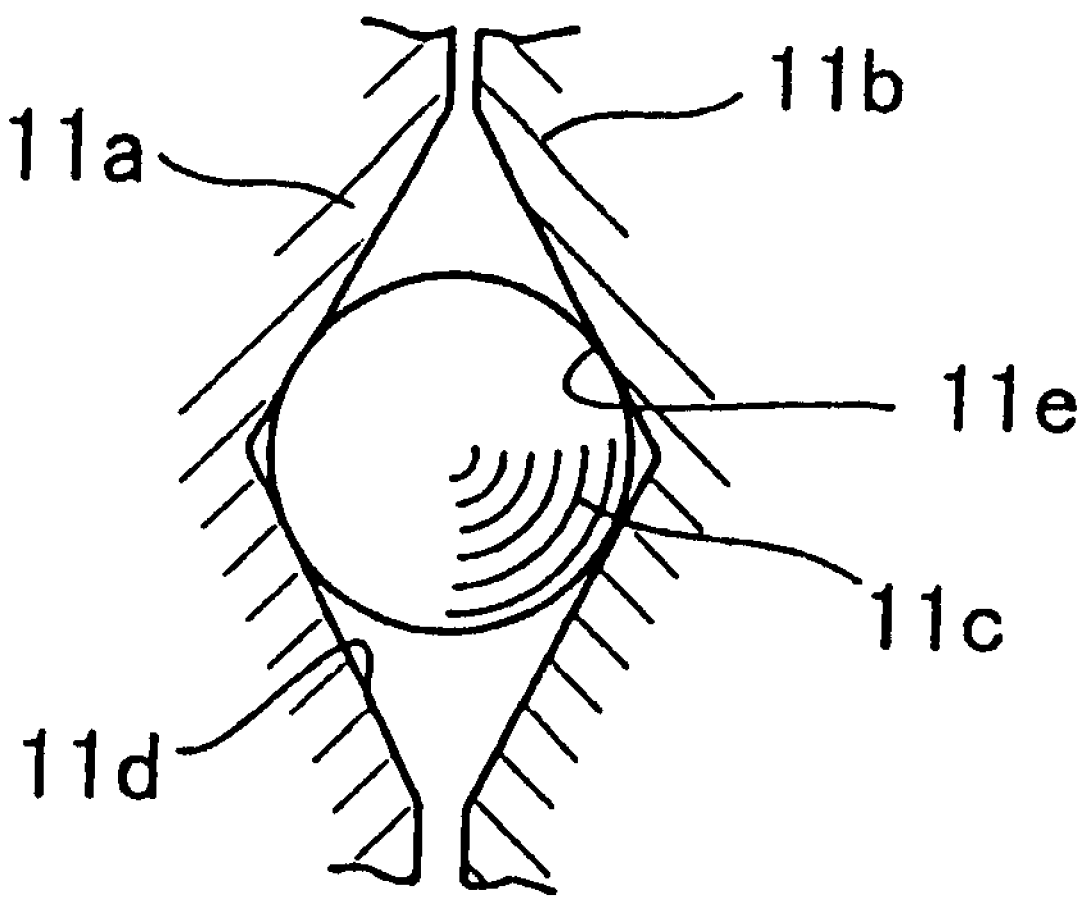
FIG. 4 is a longitudinal cross-sectional view taken along the line IV—IV of FIG. 1.

The cam mechanism 11 comprises a first cam 11a spline engaged with an outer circumference of an end of the inner race 7a on the main clutch 9 side thereof, a second cam 11b positioned between the first cam 11a and the main clutch 9 and spline engaged with the input shaft 3 and a plurality of balls 11c disposed at certain intervals in the circumferential direction between both cams 11a, 11b, and as shown in FIG. 4, a plurality of V-shaped cam grooves 11d, 11e are formed between both cams 11a, 11b so as to come into abutment with the respective balls 11c. Thus, when both cams 11a, 11b are about to rotate relative to each other by virtue of a difference in rotational speed between the input shaft 2 and the inner race 7a, a thrust force toward the main clutch 9 side is applied to the second cam 11b via the balls 11c, and the second cam 11b is brought into abutment with a clutch plate 9a of the main clutch 9, whereby the main clutch 9 is put into engagement. Note that the second cam 11b is biased to the first cam 11a side by means of a return spring 11f, and that when a torque does not act on the first cam 11a such that a difference in rotational speed is generated between the first cam 11a and the second cam 11b, the main clutch 9 is released. In addition, the first cam 11a is brought into abutment with the a clutch plate 10b of the pilot clutch 10 via a thrust bearing 11g so that a thrust reaction force is received by the pilot clutch 10.

According to the construction described above, in a case where a load acts on the output shaft 5, a loading torque equal to the torque transmission capacity of the pilot clutch 10 is transmitted to the inner race 7a of the overrunning clutch 7 via the overrunning clutch 7, and the first cam 11a is to receive a braking force equal to the loading torque. When the input shaft 3 is driven either in the forward or reverse direction in this state, the second cam 11b intends to rotate either in the forward or reverse direction relative to the first cam 11a, and as described above, a thrust force is imparted to the second cam 11b, whereby the main clutch is brought into engagement therewith, the torque being thereby transmitted from the input shaft 3 to the output shaft 5 via the main clutch 9. Thus, even if the torque transmission capacity of the overrunning clutch 7 is small, a large magnitude of torque can be transmitted via the main clutch 9.

Moreover, the rotation of the output shaft 5 overruns the rotation of the input shaft 3 in either the forward or reverse direction in a state in which the input shaft 3 is rotated in either the forward or reverse direction, the outer race 7c of the overrunning clutch 7 rotates idly in either the forward or reverse direction, and no loading torque is transmitted to the inner race 7a. As a result of this, the first cam 11a rotates idly together with the second cam 11b, and no thrust force is imparted to the second cam 11b, whereby the main clutch 9 is released. Thus, the transmission of a reverse torque from the input shaft 3 to the output shaft 5 is prevented.

Figure 5:
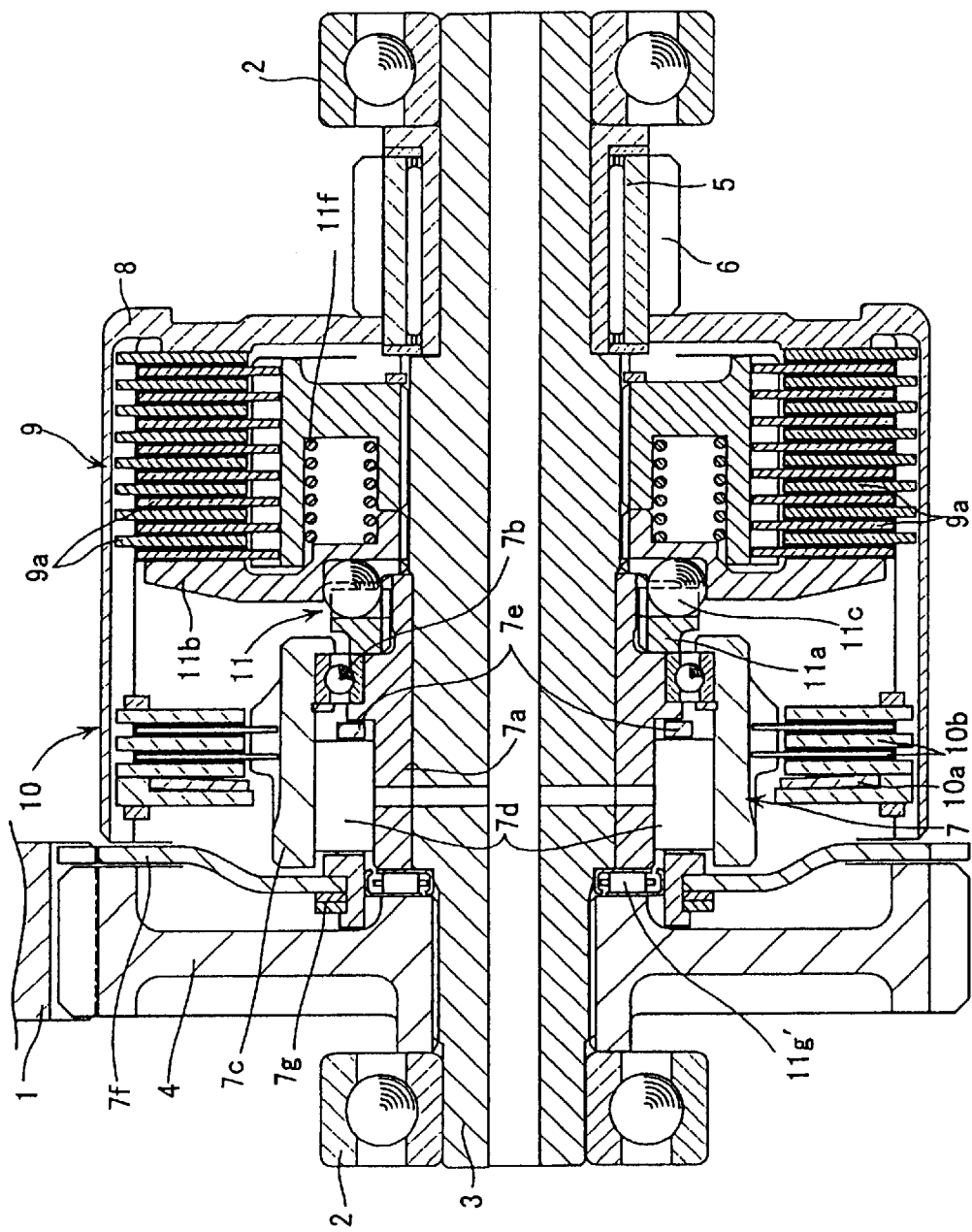
FIG. 5 is a longitudinal cross-sectional view of a second embodiment of a system according to the present invention.

FIG. 5 illustrates a second embodiment of a transmission system, and like reference numerals are imparted to members like to those described with respect to the first embodiment. A feature of the second embodiment which distinguishes it from the first embodiment is that a first cam 11a is brought into abutment against a shoulder surface of an inner race 7a of an overrunning clutch 7, and a thrust bearing 11g' is interposed between the inner race 7a and an input gear 4, whereby a thrust reaction force acting on the first cam 11a is made to be received by a casing via the inner race 7a, the thrust bearing 11g', the input gear 4 and a bearing 2.

Here, the torque transmission capacity of a main clutch 9 increases in response to a thrust force imparted to a second cam 11b, and the thrust force increases as a loading torque transmitted to the first cam 11a, i.e., the torque transmission capacity of a pilot clutch 10 increases. With the transmission system according to the first embodiment described above, since the thrust reaction force acts on the pilot clutch 10 via the first cam 11a, once there is generated a thrust force, the torque transmission capacity of the pilot clutch 10 increases and this increases in turn the thrust force, and a closed loop of a force is thus formed, whereby the main clutch 9 is put in a self-locked state. Due to this, the torque of the input shaft 3 rises as it rose to its peak at the start of driving, this peak torque is transmitted to the output shaft 5 as it is, resulting in the generation of a shock.

On the other hand, with the transmission system according to the second embodiment, since no thrust reaction force acts on the pilot clutch 10, the torque transmission capacity thereof is maintained to a constant value which is determined by the biasing force of the coned disc spring 10a, and the torque transmission capacity of the main clutch 9 is maintained to a constant value obtained by multiplying the torque transmission capacity of the pilot clutch by a predetermined amplification factor determined by a magnified force ratio of the cam mechanism 11 and a ratio of number of clutch plates between the main clutch 9 and the pilot clutch 10, and thereby a torque limiter function can be provided. Thus, it is possible to alleviate the shock by cutting the peak torque.

Thus, while the embodiments have been described heretofore in which the two-way clutch is used as the overrunning clutch 7, in a case where the input shaft 3 is driven only in one direction, a one-way clutch may instead be used.

While only certain embodiments of the invention have been specifically described herein, it will apparent that numerous modifications may be made thereto without departing from the spirit of the scope of the invention.

As is clear from the above description, according to the present invention, a transmission system having a large capacity to prevent the transmission of a reverse driving torque can be constructed using an overrunning clutch having a small torque transmission capacity, and costs involved can be reduced relatively low when compared with a case in which a special overrunning clutch having a large torque transmission capacity is used.

The present disclosure relates to the subject matter contained in Japanese patent application No. Hei.11-225534 filed on Aug. 9, 1999 which is expressly incorporated herein by reference in its entirety.

What is claimed is:

1. A transmission system comprising:

a main clutch interposed between an input shaft and an output shaft, said main clutch being constructed by a mechanical friction clutch;

an overrunning clutch permitting an overrunning rotation on an output side, an input member of said overrunning clutch being allowed to freely rotate relative to said input shaft;

a pilot clutch interposed between an output member of said overrunning clutch and said output shaft, said pilot clutch being constructed by a normally-engaged friction clutch; and a cam mechanism at least partially coupled to said input member, said cam mechanism being adapted to generate a thrust force to bring said main clutch into engagement by virtue of the difference in rotational speed between said input shaft and said input member of said overrunning clutch.

2. A transmission system according to claim 1, wherein said cam mechanism includes:

a first cam spline-engaged with said input member of said overrunning clutch;

a second cam spline-engaged with said input shaft, said second cam being abuttable on a clutch plate of said main clutch; and a plurality of balls disposed at predetermined intervals in the circumferential direction between said first and second cams.

3. A transmission system according to claim 2, wherein said first and second cams are respectively formed with a plurality of cam grooves abutting on said balls.

4. A transmission system according to claim 2, wherein said first cam is spline-engaged with an outer circumference of an end of said input member on the main clutch side, and said second cam is positioned between said first cam and said main clutch.

5. A transmission system according to claim 2, wherein said input member of said overrunning clutch includes a step portion defining a side surface at least partially abutting on said first cam, and said balls are arranged on such positions in the circumferential direction that a thrust reaction force of said first cam is supported via said input member.

6. A transmission system according to claim 5, further comprising:

a thrust bearing disposed adjacent to an end of said input member in the axial direction thereof.

\* \* \* \* \*